Figure 1:
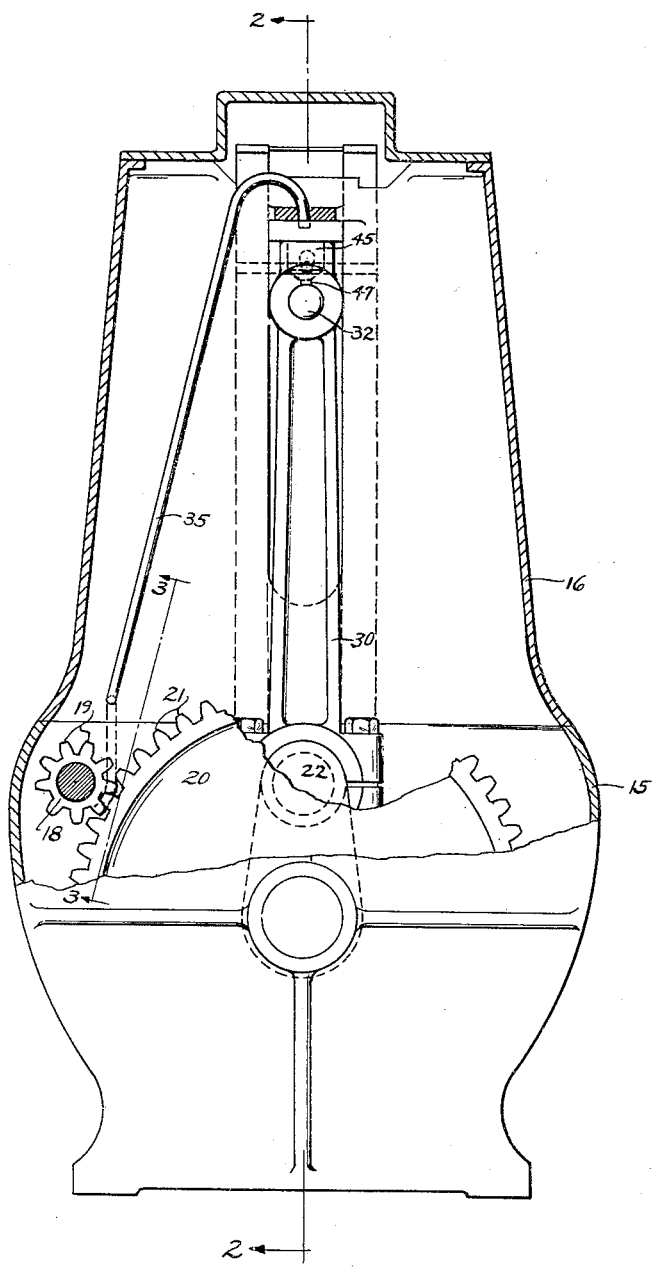

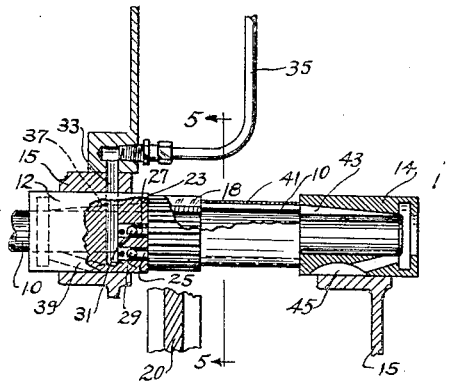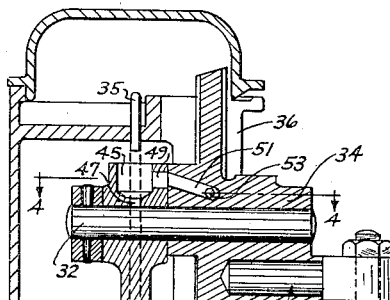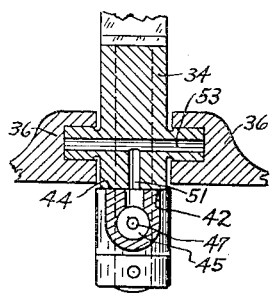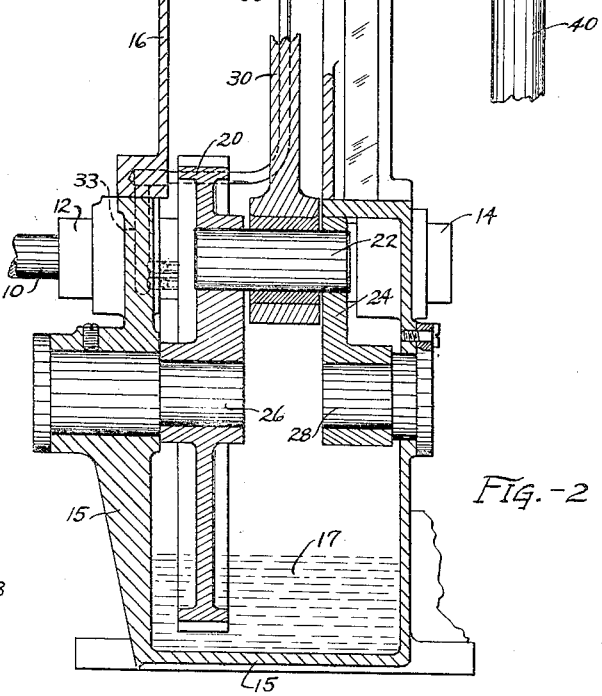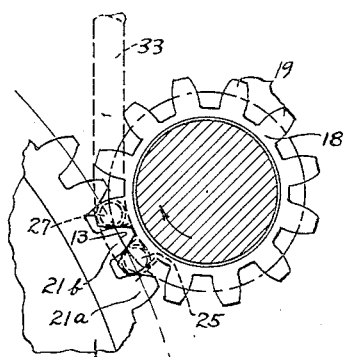

Patented Nov. 7, 1933

1,933,684

UNITED STATES PATENT OFFICE 1,933,684

AUTOMATIC OILING SYSTEM

Alfred Randolph and Edwin S. Dawson, Salem, Ohio, assignors to The Deming Company, Salem, Ohio, a corporation of Ohio Application July 29, 1929. Serial No. 381,708

3 Claims. (Cl. 184—6)

This invention relates to oiling systems, and more specifically to automatic oiling systems wherein a pump is used to distribute oil to various bearing surfaces, and the general object of the present invention is to provide a simple and foolproof automatic system for distributing oil, which may be applied to any mechanical device having a pair of operating gears, at least one of which may operate partially immersed in oil.

A further object of our invention is the provision of an oiling system which is particularly suitable for use in a power operated deep well pumping head. Other objects are the provision of a simple mechanism for forcing the oil to various bearing surfaces, and of a novel system for distributing the oil to various parts of the machine.

A still further object of our invention is the provision of a novel form of gear pump for an oiling system, which will operate regardless of the direction of rotation of the gears, and in which the ordinary gearing of the machine to which the oiling system is applied may be utilized to form the moving parts of the pump.

Other objects of our invention will become apparent from the following description taken in connection with the accompanying drawings which show a preferred form thereof. The essential characteristics will be summarized in the claims.

In the drawings, Fig. 1 is an end view partially in cross-section showing our oiling system as applied to a power pump working head; Fig. 2 is a cross sectional elevation taken substantially along the line 2—2 of Fig. 1; Fig. 3 is a cross sectional detail taken along the line 3—3 of Fig. 1; Fig. 4 is a cross-sectional detail taken along the line 4—4 of Fig. 2; and Fig. 5 is an enlarged cross-section taken along the line 5—5 of Fig. 3.

Our invention contemplates the provision of a lubricating system of extremely simple and rugged construction which is adapted for use in machinery which is operated under very severe conditions and which receives a minimum of attention. We have shown our oiling system in connection with a preferred form of power operated deep well pumping heads of the type shown and described in Patent No. 1,682,537, of Alfred Randolph issued August 28, 1928. Such working heads are generally operated exposed to the weather in rural districts and may be in continuous or intermittent use for long periods of time with no attention whatever. Thus it is absolutely essential that these working heads be provided with a reliable and fool-proof lubricating system.

In Figs. 1 and 2 of the drawings, we show our preferred form of working head, a brief description of which follows: The reference numeral 10 indicates a drive shaft mounted in bearings 12 and 14 carried by the sump member 15 of the casing 16. The shaft 10 carries a pinion 18 rigidly mounted thereon and meshing with a crank gear 20.

The crank pin 22 is supported by the gear 20 and a crank throw 24 which are mounted on stud bearings 26 and 28 respectively, extending through suitable openings formed in the sump member 15. A connecting rod 30 is operated by the crank pin 22 and at its upper end, the connecting rod is provided with a wrist pin 32 which extends through and is rigidly mounted in a suitable opening in the cross head 34. The cross head is mounted on guides 36 carried by the casing 16 and is provided with a pin 38 to which the pump rod 40 may be secured in any suitable manner.

Our oiling system comprises novel means for lifting the lubricant from the sump at the bottom of the casing and distributing it to various bearing surfaces throughout the mechanism. The sump member 15 may be partially filled with oil as at 17 so that the gear 20 will be partially immersed. When the device is in operation and the gears are rotating the teeth 21 of the gear wheel 20 passing through the oil in the sump member 15 will always carry up a thick film of oil between them, due to the viscosity of the oil and capillary attraction. As the teeth carry more oil than there is room for when the gear and pinion mesh together, some of the oil will be forced from between the teeth 21 when they are in mesh with the teeth 19 of the pinion 18. A part of the oil may escape in a direction opposite the direction of rotation of the gears, but not all can go that way because as each pinion tooth 19 comes into contact with the corresponding gear tooth 21, escape in that direction is cut off, and substantially all of the remainder of the oil will be forced under pressure from between the contacting teeth in a direction parallel to the teeth faces or axially of the gears. As shown in detail in Figs. 3 and 5, we have provided means for utilizing this phenomenon in order to pump oil to any other parts of a machine which may require lubrication.

In the end of the bearing 12 which abuts a face of the pinion 18 as at 23, we have provided openings 25 and 27 which lie in the line of contact of the gear teeth, as shown in Fig. 5, and which may receive oil forced from between the teeth. Ball check valves 29 and 31 may be placed in the ducts leading to these openings, which communicate with the duct 33 which may be partly within the bearing and partly within the casing 15, and to which the tube 35 is connected. The tube 35 functions to carry the oil to a reservoir at the top of the working head, from which point it may be distributed by gravity to any points desired.

A tapered oil groove 37 in the bearing 12 opens adjacent the pinion and admits oil to the bearing. A suitable overflow passage 39 is provided which permits excess oil to flow back into the sump. In order to lubricate the bearing 14 a sleeve 41 may be loosely mounted on the shaft 10, extending from the pinion 18 to the bearing 14. Some of the oil forced from between the gear teeth will be carried along the inside of the sleeve to the tapered oil groove 43 and the excess may flow back to the sump through the passage 45.

In order to insure satisfactory operation of our oiling system regardless of the direction of rotation of the gears we provide two openings adjacent the faces of the gears, one on each side of the point of tangency 13 of the pitch circles of the gears. As shown in Fig. 5 where two of the teeth 19 of the pinion 18 are broken away, the opening 25 is below the point of tangency and the opening 27 is above. Assuming that the gears are rotating in the direction shown by the arrow on the pinion, the teeth will be coming together below the point of tangency and the oil between teeth 21a and 21b will be forced into the opening 25. At the same time the teeth above the point of tangency will be moving apart and the check valve 31 (see Fig. 3) will prevent oil from flowing back through the opening 27 into the space between teeth 21b and 21a. When the gears are rotating in the opposite direction the operations will be reversed, oil will be forced into opening 27, and the valve 29 will prevent oil from flowing back through opening 25.

As heretofore mentioned, the oil pumped up into the tube 35 is carried thereby to a suitable reservoir near the top of the machine, from which it may be distributed by gravity. We have shown such reservoir in the form of an oil cup 45 in the top of the connecting rod 30 and have shown a special means for conveying such oil to the cross head bearings. These features of distribution are covered in our divisional application Serial No. 456,834, filed May 29th, 1930. Reference is made to that case for claims in these features. However, we now describe this connecting rod and cross head distribution of oil as shown herein.

As the cross head 34 and the connecting rod reciprocate the cup 45 will be filled by oil flowing from the tube 35. A duct 47 leads from the cup to the surface of the wrist pin 32. As shown in Fig. 4 an oil duct 49 leads from the cup to the plane surface 42 of the connecting rod, which contacts with another plane surface 44 on the cross head. The duct 51 in the cross head has an opening adjacent the opening of the duct 49. These openings are large enough to allow oil to flow from the duct 49 into the duct 51 at the greatest angular displacement of the connecting rod. At right angles to the duct 51 there is an oil passage 53 which serves to convey oil to the cross head guides 36. Any excess amount of oil may drip back into the sump and be recirculated.

When the device is in operation the rotation of the gear 20 carries oil from the sump 15 up to the point where the gear meshes with the pinion 18. Then the excess oil is forced from the gear, and that part of the excess which flows out in a direction parallel to the teeth faces is distributed to other parts of the machine which require lubrication. A portion of the oil flows into the groove 37 and lubricates the bearing 12. Another portion flows inside the sleeve 41 to lubricate the bearing 14. Some of the oil is forced through the openings 25 or 27 and into the tube 35 which conveys it to the upper part of the machine. From the tube 35 it flows into the oil cup 45 which supplies oil to the wrist pin bearings and cross head guides. Any overflow from the cup 45 flows down the connecting rod 30 and assists in lubricating the crank pin 22; and excess oil supplied to any of the bearings may flow back into the sump so that the cycle of operation will be continuous.

We claim:

1. In an automatic oiling system, the combination of gears adapted to mesh together, the intermeshing surfaces of the gears being continuous, means for supplying oil to the gears in excess of the amount required for their lubrication, a duct positioned with its open end at the end of the line of contact of the gears and on one side of the point of tangency of the pitch circles of the gears for receiving and distributing the excess oil forced from the teeth of the gears by the meshing operation when they are rotating in one direction, said duct communicating with an oil distributing tube, a similar duct positioned on the other side of the point of tangency of the gears and communicating with the same distributing tube for receiving and conveying the excess oil when the gears are rotating in the opposite direction, there being a check valve in each duct to prevent back flow of oil from the tube to the gears.

2. In combination, a pinion and a shaft associated therewith, bearings for mounting the shaft, a gear adapted to mesh with the pinion, means for supplying oil to the gear, means including a sleeve mounted on said shaft and having one end adjacent a face of the pinion, for conducting oil forced from between the gear and the pinion while they are in mesh to a bearing in which the shaft is mounted, a member abutting the opposite face of the pinion at the meshing point with the gear, an opening in the abutting member, and a conduit communicating with said opening to conduct oil to other points.

3. In combination a pinion, a gear adapted to mesh with the pinion, means for supplying oil to the gear teeth, a member abutting one end of the pinion teeth at the point where pinion and gear mesh, an opening in the abutting member, and a conduit communicating with said opening to conduct oil forced from the meshing teeth to a point of lubrication, said conduit having a restricted outlet, a second member abutting the other end of the pinion teeth at the meshing point, an opening in said second member, a duct leading from the last-mentioned opening to an elevated point of lubrication, and a check valve in said duct to prevent a back-flow of oil from the duct to the gear, whereby the restricted conduit causes sufficient pressure to force a flow of oil through the duct to the elevated point.

ALFRED RANDOLPH.
EDWIN S. DAWSON.